Figure 1:
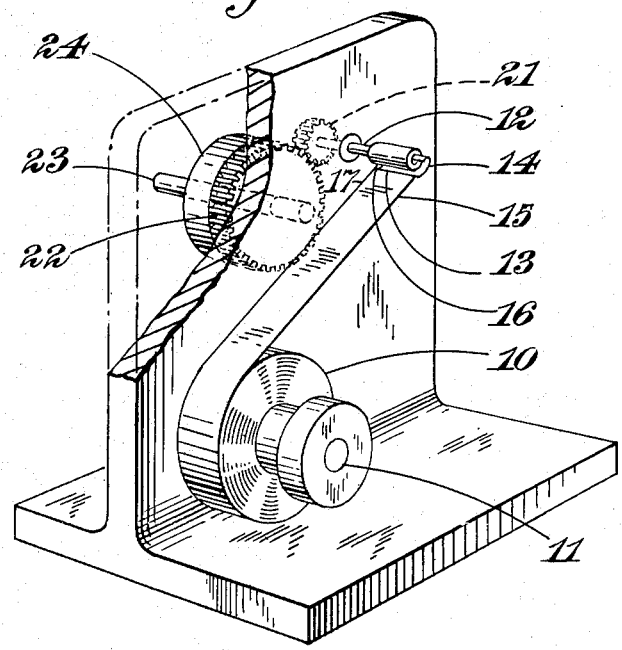

Jan. 10, 1956  R. A. GROUSE  2,729,878
ELECTRICAL CAPACITORS
Filed Sept. 7, 1950

INVENTOR
Richard A. Grouse

By Watson, Cole, Grindle & Watson
Attorneys 2,729,878
Patented Jan. 10, 1956

2,729,878

ELECTRICAL CAPACITORS

Richard Alfred Grouse, Wandsworth, London, England, assignor to A. H. Hunt Capacitors Limited, London, England, a British company Application September 7, 1950, Serial No. 183,489

Claims priority, application Great Britain September 8, 1949

7 Claims. (Cl. 29—25.42)

This invention comprises improvements in or relating to electrical capacitors. The invention relates to capacitors of the type wherein the electrodes and the dielectric are rolled together and the terminal connections are taken from the two ends of the roll. It is an object of this invention to make capacitors of this type which are of low capacity in a simple manner without involving the difficulties of handling which commonly occur in making very low capacity rolled capacitors.

Ordinarily, in making rolled capacitors, two dielectrics are rolled together and metal foil is fed between them. Thus there are at least four continuous strips of material which need to be fed and kept in proper relation to one another, namely, the two dielectrics and the two electrodes. In many cases, however, it is desired to have more than one thickness of dielectric between the electrodes in order to eliminate any risk of a puncture through a defect in the dielectric, and in such case there will be at least six different strips of material to be fed together in a winding machine and there may be more than six such strips. The capacity produced by so feeding strips of dielectric and of metal foil is high for a given number of turns and therefore, especially in the case of low capacity components, the number of turns is relatively low and considerable labour is involved in adjusting the strips into their correct relative position before winding commences, and such labour occupies an undue proportion of the total time of manufacture.

According to the present invention a process of producing an electrical capacitor of the type described consists of winding from a single strip of dielectric a roll, and feeding at intervals into the roll as it is wound, cut strips of metal foil, each strip of foil having a length sufficient for substantially one turn of the roll, the intervals between feeding successive foils being such that between each turn of metal foil there is wound one or more turns of dielectric, and means for connecting electrically alternate turns of metal foil to constitute the two electrodes of the capacitor.

The strips of metal foil above mentioned may be fed into the roll in staggered relationship to each other so that one of the longitudinal edges of each strip projects outwardly from the roll, alternate strips projecting from opposite ends of the roll, the other longitudinal edges of each metal strip not reaching as far as the ends of the roll. With this arrangement it is convenient to solder terminal wires to the projecting turns at each end of the capacitor when it is completely wound.

The dielectric strip may be suitably formed of a plastic polymer (for example polystyrene), and the metal foil strip may be of copper.

According to another feature of this invention the winding operation may be caused to proceed in a series of stops, the winding spindle stopping after a predetermined angular movement to permit the operator to insert a piece of foil in the nip where the strip of dielectric joins the roll and then proceeding again for a predetermined angular movement, stopping for insertion of a foil and so on.

The result is the production of a capacitor in which electrodes of opposite polarity alternate with one another concentrically, the electrodes being separated by the turns of plain dielectric which have been fed into the roll without being accomplished by any electrode. While a capacitor of any desired capacity can be built up in this way, the method is obviously primarily economical in the production of low capacity units because electrodes of opposite polarity are not fed into the rolls simultaneously and the roll does not build up to full size so quickly as if a number of strips are being fed in together. On the other hand, as there is only a single strip of dielectric to manipulate, the operation is considerably simplified.

Figure 2:
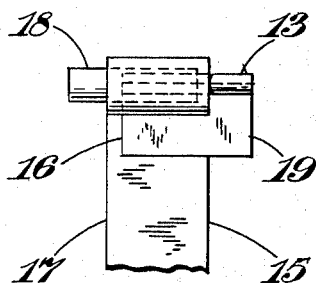
Figure 3:
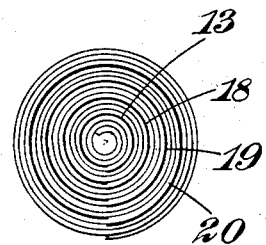

One embodiment of this invention will now be described by way of example with reference to the following drawings in which:

Figure 1 is a diagrammatic representation of the winding operation in accordance with the present invention, Figure 2 is a plan view of the capacitor at one stage of the winding operation, Figure 3 is an end elevation of the capacitor at the finish of the winding operation.

Referring now to Figure 1, a roll of dielectric 10 (for instance polystyrene strip material) is freely mounted on a spindle 11 which is in alignment with a mandrel 12. The mandrel may be rotated by an electric motor (not shown) through suitable gearing. In the drawing, Figure 1, a gear wheel 21 is shown meshing with a larger gear 22 on a spindle 23 which carries a control housing 24. The control housing contains a one revolution clutch drive of conventional type operated by a foot-pedal (not shown) which is actuated by the operator. The effect is that whenever the operator depresses the foot-pedal the spindle 12 is rotated a number of times depending upon the ratio of the gear 22, 21, and then stops.

The first action of the winding operation is to wind two or three turns of the dielectric strip on to the mandrel by depressing the foot-pedal. After this has been completed the rotation is stopped and a cut strip of copper foil, which is approximately the same width as the dielectric, is placed on top of that portion of the dielectric which is about to be wound on to the roll, the position of the copper foil being such that one of its longitudinal edges overlies the edge of the dielectric, whilst its other longitudinal edge lies a distance inwardly from the opposite edge of the dielectric. This is shown in Figure 1 where the first piece of copper foil 13 is partly wound into the roll and the edge 14 of the copper foil overlies the edge 15 of the dielectric, whilst the edge 16 of the copper foil lies inwardly of the edge 17 of the dielectric. The length of the copper strip is predetermined so that it is rather more than sufficient to complete one turn of the roll at this stage.

After the first piece of copper foil has been wound into the roll, two or three more turns of the dielectric are wound on by pressing the foot switch once again, and then the winding again stops. The second piece of copper foil is then placed in position for winding and the machine restarted. The second strip of copper foil is like the first but will not overlap one turn quite so much, as the roll at this stage will be of increased diameter. The second piece of copper foil is positioned with the dielectric strip to be in staggered relationship with the first piece of copper strip, that is to say one longitudinal edge of the copper strip is made to project outwardly on the opposite side of the dielectric to that previously, and, accordingly, the opposite longitudinal edge of the copper foil will be inward of the end of the roll.

The operation is continued in a similar manner for a third piece of copper foil which is staggered relative to the second, thus projecting on the same side as the first piece of copper foil. Figure 2 shows this third piece as 19 partly wound on to the roll, 13 and 18 being respectively the first and second pieces of copper foil. The winding operation is completed with the winding on of a fourth piece of copper foil which is made to project on the same side as the second piece of foil, and followed by final turns of dielectric wound on for protective purposes, the dielectric being cut and secured by melting locally with a hot iron. Obviously, instead of having only four foils there might be six or more. The outer foils will not occupy more than one revolution.

Figure 3 shows diagrammatically, an end view of the capacitor after the completion of the winding process, with reference 20 indicating the fourth strip of copper foil. It will be seen that the turns of copper foil are concentric with each other and that three thicknesses of dielectric separate each of them.

The terminal wires may be secured to the projecting copper turns at each side of the capacitor by any convenient means as, for example, by forming each terminal wire with an eye to fit over the outer turn of copper foil, and soldering across the eye and the ends of the turns.

It will be appreciated that a comparatively large number of copper turns may be wound in this way where the rating of the capacitor requires it, and, on the other hand, it may be desirable for very small capacities to have only two turns of copper foil, each constituting one electrode. A capacitor of the latter kind wound in the manner described, and having the approximate dimensions of, 0.0006 in. for the thickness of the dielectric, 1½ in. for the width of the dielectric, and 3/16 in. for the inner diameter of the roll, will have a capacity of the order of 330 picofarads.

The capacitors wound in the manner described are light in weight, of convenient size, and of constant capacity value. They do not require impregnation or protective covering if used in the interior of apparatus such as television sets.

I claim:

1. A process of producing an electrical capacitor, consisting of winding from a single strip of dielectric a roll, and feeding at intervals into the roll as it is wound rectangular cut strips of metal foil so that the foil strips are spaced apart in the roll longitudinally of the dielectric strip, the foil strips all having the same width and being fed into the roll in staggered relationship so as to form two series, with each foil strip extending up to one end of the roll but not the other end and the foil strips of the two series extending up to opposite ends of the roll and overlapping one another in the roll to form capacitor electrodes of opposite polarity, and thereafter connecting a terminal at each end of the roll to the foil strips of the series extending up to that end.

2. A process of producing an electrical capacitor according to claim 1, wherein each foil strip projects beyond one end of the roll.

3. A process for producing an electrical capacitor according to claim 1, wherein alternate foil strips are fed into the roll so as to extend up to opposite ends of the roll and each foil strip is of a length such that it occupies substantially all of that turn of the roll in which it is wound.

4. A process of producing an electrical capacitor according to claim 1, wherein the winding operation is caused to proceed with a series of stops, the winding stopping after a predetermined angular movement to permit the operator to insert a piece of foil in the nip where the strip of dielectric joins the roll and then proceeding again for a predetermined angular movement, and again stopping for insertion of a foil.

5. A process of producing an electrical capacitor, consisting of winding from a single strip of dielectric a roll, and feeding at intervals into the roll as it is wound rectangular cut strips of metal foil so that the foil strips are spaced apart in the roll longitudinally of the dielectric strip, the foil strips all having the same width and being fed into the roll in staggered relationship so as to form two series with each foil strip projecting beyond one end of the roll but not extending up to the other end and the foil strips of the two series projecting beyond opposite ends of the roll and overlapping one another in the roll to form capacitor electrodes of opposite polarity, and thereafter connecting a terminal at each end of the roll to the foil strips of the series projecting from that end.

6. A process of producing an electrical capacitor, consisting of winding from single strip of dielectric a roll, and feeding at intervals into the roll as it is wound rectangular cut strips of metal foil so that the foil strips are spaced apart in the roll longitudinally of the dielectric strip, each of which foil strips has the same width and is long enough to occupy substantially all of that turn of the roll in which it is wound, the foil strips being fed into the roll in staggered relationship such that each projects beyond one end of the roll but does not extend up to the other end and alternate foil strips project at opposite ends of the roll and overlap one another in the roll to form capacitor electrodes of opposite polarity, and thereafter connecting a terminal at each end of the roll to the foil strips projecting at that end.

7. A process of producing an electrical capacitor, consisting of winding from a single strip of polystyrene dielectric a roll, and feeding at intervals into the roll as it is wound rectangular cut strips of copper foil so that the foil strips are spaced apart in the roll longitudinally of the dielectric strip, each of which foil strips has the same width and is long enough to occupy substantially all of that turn of the roll in which it is wound, the foil strips being fed into the roll in staggered relationship such that each projects beyond one end of the roll but does not extend up to the other end and alternate foil strips project at opposite ends of the roll and overlap one another in the roll to form capacitor electrodes of opposite polarity, and thereafter connecting a terminal at each end of the roll to the foil strips projecting at that end.

References Cited in the file of this patent

UNITED STATES PATENTS

| 859,923 | Davis | July 16, 1907 |
| 1,841,628 | Pickard | Jan. 19, 1932 |
| 2,163,294 | Simons | June 20, 1939 |
| 2,382,065 | Kappeler | Aug. 14, 1945 |
| 2,480,503 | Nordberg | Aug. 30, 1949 |
| 2,565,093 | Robinson | Aug. 21, 1951 |
| 2,637,766 | Grouse | May 5, 1953 |

FOREIGN PATENTS

| 437,429 | Great Britain | Oct. 29, 1935 |
| 563,084 | Great Britain | July 28, 1944 |